United States Patent [19]

Horowitz

[11] 3,924,059

[45] *Dec. 2, 1975

[54] PAY TELEVISION SYSTEMS

[75] Inventor: Irving Horowitz, Eatontown, N.J.

[73] Assignee: Teleglobe Pay TV System Inc., Rego Park, New York, N.Y.

[ * ] Notice: The portion of the term of this patent subsequent to July 16, 1991, has been disclaimed.

[22] Filed: Dec. 28, 1973

[21] Appl. No.: 429,216

Related U.S. Application Data

[62] Division of Ser. No. 227,582, Feb. 18, 1972, Pat. No. 3,824,332.

[52] U.S. Cl. .......................... 178/5.1; 178/DIG. 13

[51] Int. Cl.$^2$ .......................... H04N 1/44

[58] Field of Search .......................... 178/5.1, DIG. 13

[56] References Cited

UNITED STATES PATENTS

| | | | |
|---|---|---|---|
| 2,972,009 | 2/1961 | Roschke | 178/5.1 |
| 3,081,376 | 3/1963 | Loughlin et al. | 178/5.1 |
| 3,440,338 | 4/1969 | Walker | 178/5.1 |

*Primary Examiner*—Maynard R. Wilbur
*Assistant Examiner*—S. C. Buczinski
*Attorney, Agent, or Firm*—Michael S. Striker

[57] ABSTRACT

Reference pulses of opposite polarity to the horizontal sync pulses are added to the composite television signal just preceeding each horizontal sync pulse. The video portion of the signal is inverted for randomly selected fields. Coding bursts are added to the composite signal to indicate whether subsequent field is inverted. Transmitter clamped to reference pulse level. Reference pulse used for AGC in decoder. Video portion of received signal inverted in accordance with coding bursts. Audio program signals encoded by modulation on suppressed carrier centered above audio range. Barker signals transmitted on normal audio frequencies.

6 Claims, 16 Drawing Figures

PAY TELEVISION SYSTEMS

This is a division, of application Ser. No. 227,582 filed on Feb. 18, 1972, now Pat. No. 3,824,332.

BACKGROUND OF THE INVENTION

This invention relates to pay television systems. It is the object of such television systems to encode the signal at the transmitter in such a manner that a receiver cannot furnish a picture unless a decoder is activated by the subscriber. Activation of the decoder of course leads to charges for the program received. In known methods and arrangements of the above-described types, the transmitted signal is encoded by varying the timing between the video and synchronizing components, that is selectively retarding or advancing the video component relative to the synchronizing signals. Key signals are then transmitted which indicate the necessary retardation or advance of the signal which must be effected in the receiver in order that the final system furnished to a paying subscriber may have the video portion of the signal in the correct relationship relative to the synchronizing portion.

In other known systems of the above-described type, the coding operates on the synchronizing portions of the signal. For example, the field synchronizing components of the television signal may be frequency modulated on the picture carrier, while the line synchronizing components are coded and then transmitted to subscriber receivers concurrently with the sound-signal components on a sound carrier. Key signals indicating the coding schedule of the line synchronizing components are transmitted to subscriber receivers over a separate channel. Both of the above-described systems have definite drawbacks. The first lends itself rather readily to unauthorized decoding, the second requires a great deal of extra equipment since a standard television transmitter cannot be used.

SUMMARY OF THE INVENTION

It is an object of the present invention to furnish an encoding and decoding system and method which allows use of a standard transmitter, require relatively little additional equipment and still have a high immunity to unauthorized decoding.

It is a further object of the present invention to furnish a method and system for encoding and decoding the audio signal associated with the program to be transmitted, to prevent reception of said audio signal without use of the decoding unit.

It is a further object of the present invention to provide a Barker audio signal which is audible on a standard television signal without decoding, to give the information required by the subscriber to decide whether or not to pay for the particular program.

In accordance with the present invention, a standard composite television signal having a video signal with a determined black level signifying picture black and further having synchronizing signals of a determined synchronizing level and polarity relative to said black level is encoded by the following steps:

First, a sequence of reference pulses having a polarity opposite to said synchronizing polarity, each displaced by a determined time interval from a corresponding one of said synchronizing signals is generated. Said sequence of reference pulses is combined with said composite television signal. The resulting signal, including all synchronizing and video portions, is transmitted, but the reference pulse occupies the levels normally associated with the horizontal synchronizing signals. The width of the reference pulse is not sufficiently wide to allow synchronizing of a receiver onto said reference pulse.

The transmitted signal is further encoded by reversing the polarity of the video signal during randomly selected fields. Encoding bursts are injected into the composite signal prior to transmission to indicate whether or not the subsequent field has a video portion to be inverted.

The audio portion of the program is encoded by modulating said program audio signals onto a suppressed carrier. In a preferred embodiment of the present invention, said suppressed carrier is derived from the horizontal synchronizing signals and has a frequency equal to twice the horizontal line frequency. The frequency range normally occupied by the program audio signals is used to transmit a barker signal giving information about the program to the subscriber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
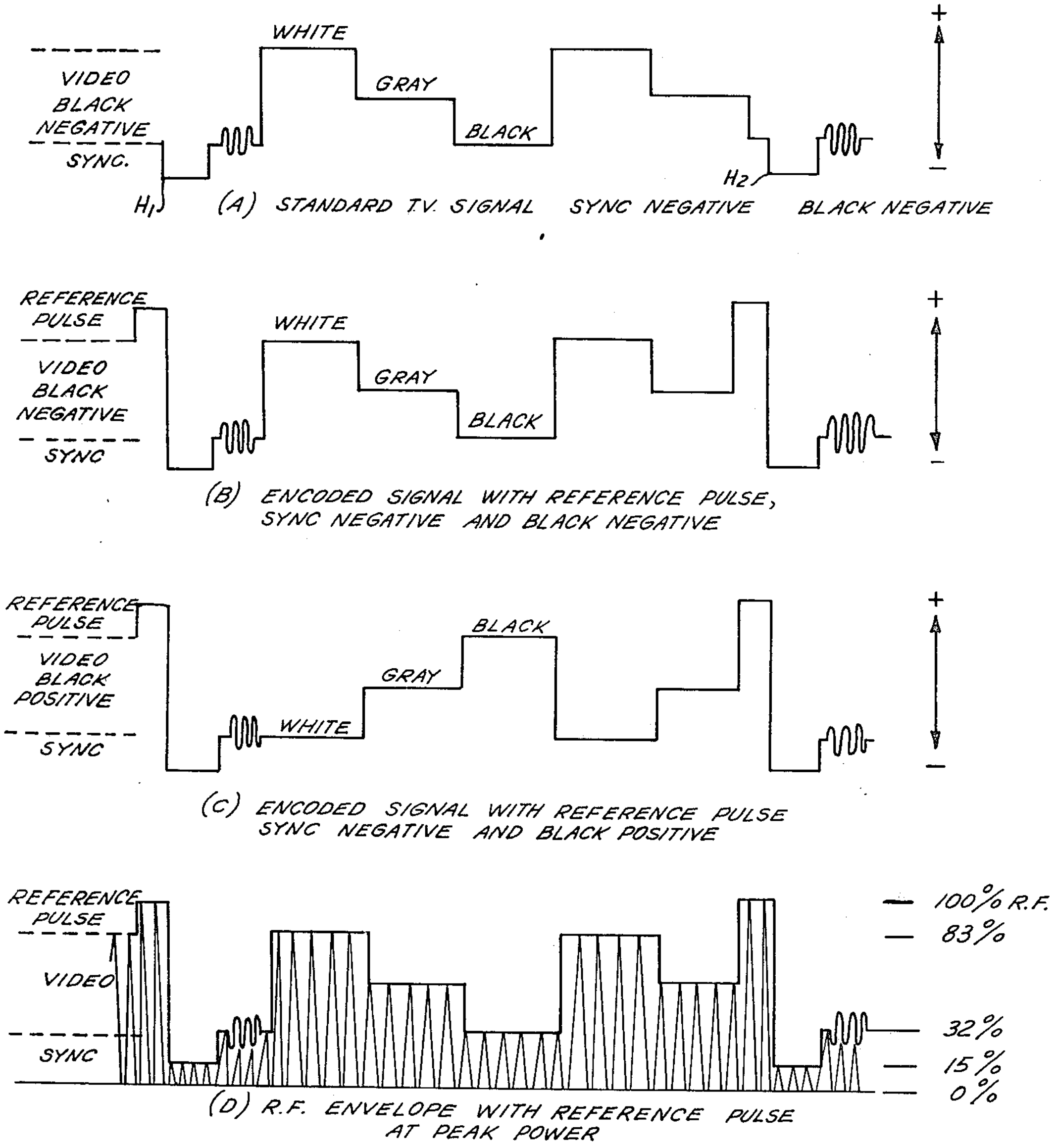
FIG. 1 shows the unencoded and encoded television signals of the present invention.

A preferred embodiment of the present invention will now be described with reference to the drawing.

The underlying principle of the present invention is best understood with reference to FIG. 1 which shows the wave forms of both the standard television signal on which the encoder of the present invention operates and the signals following the encoding. Reference to line A shows a standard television signal having a black negative level and negative synchronization pulses. In particular, line A shows the interval between two sequential horizontal synchronization pulses. The horizontal synchronization pulses are labelled respectively $H_1$ and $H_2$. On the back porch of the horizontal synchronization pulses are the color bursts which form part of the standard color television signal. Following the color bursts is the video portion of the signal. This is indicated in stylized form, that is a white, grey and black level as shown. Of course the actual video signal would have variations between these various levels depending upon the picture to be transmitted. In accordance with the present invention, the above-described signal is encoded in two ways; first a reference pulse is added on the front porch of the horizontal synchronizing signals and the signal is transmitted in such a manner that the reference pulse occupies the amplitude levels and has the polarity normally associated with the synchronization signal. Although the horizontal and vertical synchronization signals are transmitted, these are transmitted at opposite polarity to their usual polarity, thereby preventing a receiver receiving such an encoded signal from synchronizing thereto. Further, the width of the reference pulses is made sufficiently narrow that the synchronizing circuits of the receiver do not respond thereto. Thus the receiver receiving such an encoded signal will see an image which is unsynchronized both horizontally and vertically, unless the decoder is activated by the subscriber.

As an additional measure, the video portion of the signal indicated by the white, grey and black levels in the standard signal described above is inverted during some fields. The signal is either transmitted in the standard black negative or in a black positive fashion throughout any one particular field, but the video sense may be reversed either from field to field, or else randomly as will be described below. Thus not only is the received signal, if not decoded, unsynchronized, but also the video levels are inverted. On a normal black and white television receiver a substantially blank resister will result. On a color receiver the luminance portion of the signal would at least partially cancel out. Since on opposite polarity fields, the chrominance signal will be 180° out of phase while the sense of the color burst remains unchanged, the colors visible will have no discernible relation to the true information and will flicker strongly according to the random switching rate. Further the lack of horizontal synchronization will also cause the color burst gate to be unsynchronized with the color burst and on most receivers no color would be visible.

Line B of FIG. 1 shows the encoded signal including the reference pulse. In this case the video portion of the signal has not been inverted and the black negative level still exists. In the following line, line C, the encoded signal with reference pulse, and sync negative, black positive level is shown.

Line D of FIG. 1 shows the RF envelope and indicates that the reference pulse represents peak power from the transmitter. It should be noted with reference to this Figure that the video transmitter sees a standard composite television signal except for the absence of the front porch of the horizontal synchronization pulses. The transmitter clamps at the pulse tip of the reference pulse instead of at the pulse tip of the synchronization pulses. A standard transmitter can thus be used without modification.

Figure 2:
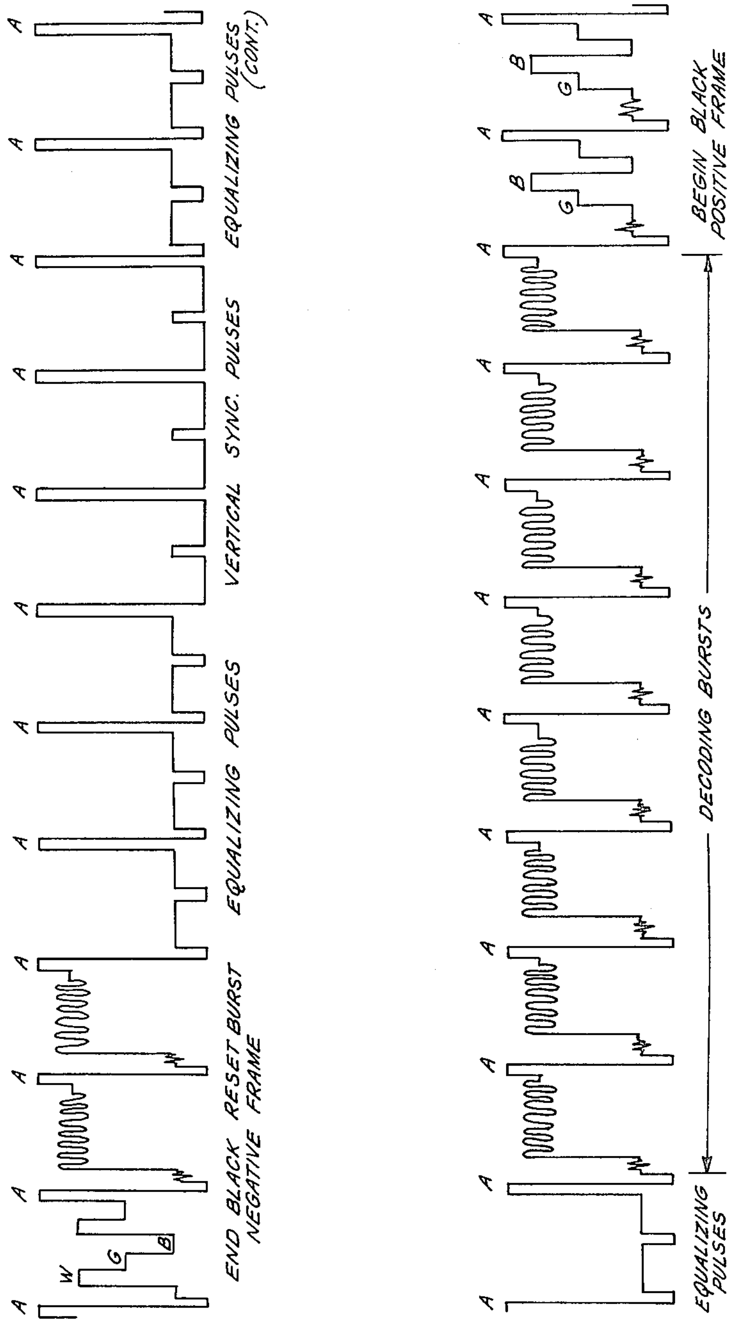
FIG. 2 shows the vertical blanking interval of an encoded television signal in accordance with the present invention.

FIG. 2 shows the vertical blanking interval of the standard television signal after encoding. It will be noted that it is a standard vertical blanking interval with the vertical synchronizing pulses and equalizing pulses intact. The only difference is that the reference pulses have been added on the front porch of the horizontal sync pulses. Further it will be noted that decoding bursts have been added following the equalizing pulses. It is the function of these decoding bursts to indicate the polarity of the video signal for the subsequent field, that is whether the subsequent field will have a black positive or a black negative level. Further it will be noted that just prior to the first equalizing pulses reset bursts are added. As will be described in more detail below, it is the function of the reset burst to reset the gate which determines the polarity of the subsequent frame. The use of these reset bursts allows a minimum equipment to be used in the decoders. Of course this is particularly desirable since there is a far larger number of decoders required than the signal encoder at the transmitter. In the simplet possible embodiment of the present invention it is of course possible to use a single decoding burst to indicate that the subsequent frame will be black positive, for example, and to use the absence of decoding bursts to indicate a black negative frame. This type of system, although simplest, offers the least security. In order to achieve greater security the decoding bursts may contain bursts of a number of frequencies and as many as eight bursts may be used. Thus a great flexibility in encoding to signify the polarity of the next frame is available.

Figure 3:
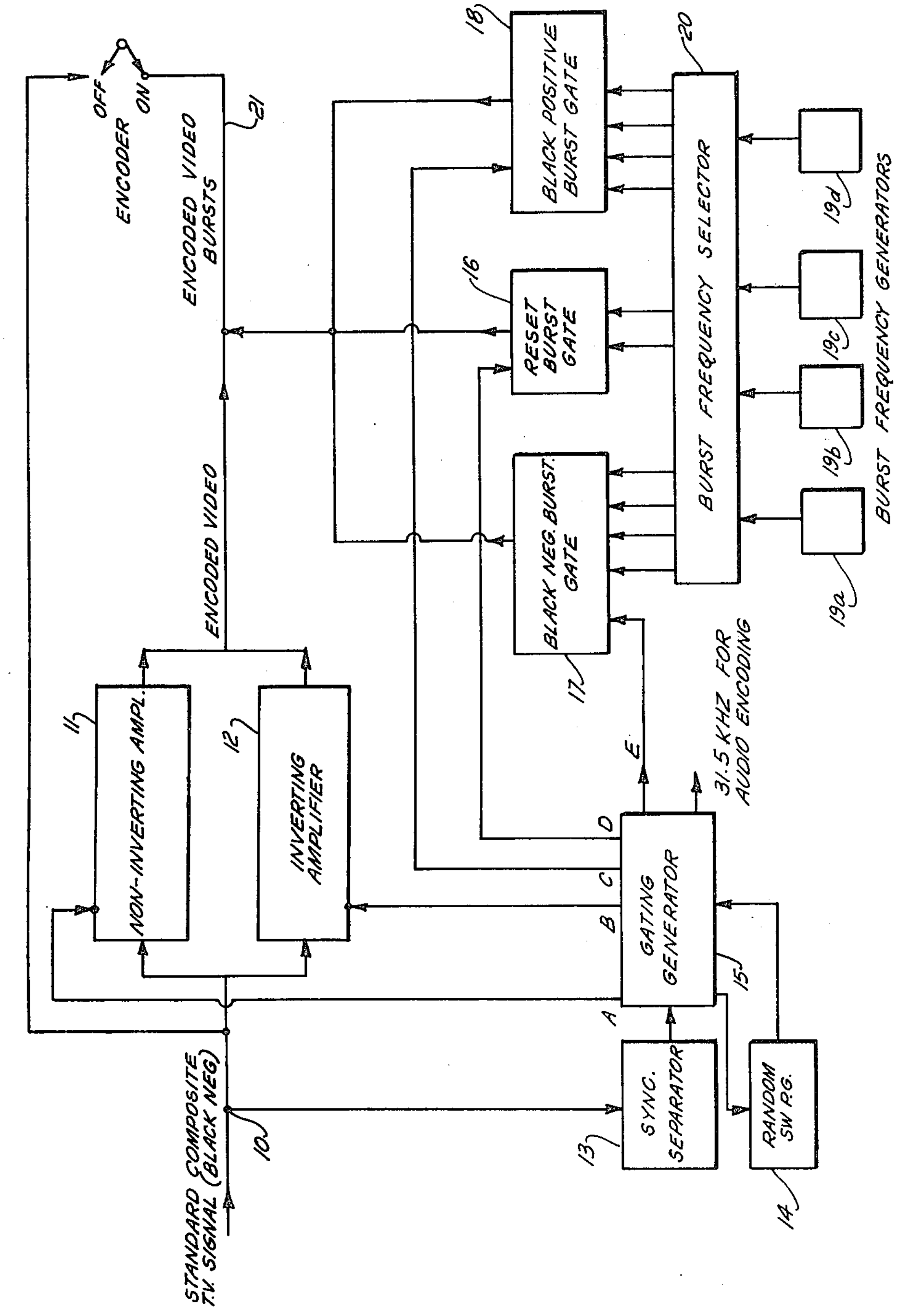
FIG. 3 is a block diagram of the encoder unit.

The block diagram of the video encoder is shown in FIG. 3. A standard composite television signal (black negative) is furnished at input terminal 10. All parts of the signal received at terminal 10 are transmitted through the non-inverting amplifier 11 except that the video portion of those fields for which the video portion is to be inverted is transmitted through inverting amplifier 12. Since the incoming standard composite television signal is simultaneously applied to the input of both amplifier 11 and amplifier 12, it is obvious that gating signals will have to be provided to switch one amplifier on and one amplifier off at all times. The only exception is that with particular techniques used in the present invention both amplifiers are cut off (furnishing $B^+$ voltage) for forming of the reference pulse. This furnishes an extremely reliable reference.

The required enabling signals are furnished by gating generator 15, specifically, the signal on line A enables amplifier 11, while the signal on line B enables amplifier 12. The gating generator in turn is controlled by the horizontal and vertical synchronization signals derived from the incoming composite television signal by means of a standard sync separator 13. The output of the sync separator is also used to sample the output of a random switching pulse generator whose so-sampled output is used to determine whether or not the video portion of the subsequent field is to be inverted, that is whether or not the signal on line B is to appear during the subsequent field. The sync separator 13 is a standard circuit which may for example be found in FIG. 4 in "Television Service Manual" 3rd Edition, second printing, 1970, published by Theodore Audel & Co. The circuits associated with units 14 and 15 will be discussed in detail below. For the present it is sufficient that an encoded video signal is derived at the combined outputs of amplifiers 11 and 12. It is further of course necessary that the reset bursts be added to the encoded signal. This is accomplished by enabling reset burst gate 16 via an output D of gating generator 15 at the time of the two horizontal line intervals immediately preceding the equalizing pulses in the vertical blanking interval (see also FIG. 2). It is further essential that the decoding burst indicated as following the equalizing pulses during the vertical blanking interval (again see FIG. 2) be added to the encoded video signal. This is accomplished by enabling either black negative burst gate 17 or black positive burst gate 18 via lines E and C, respectively. Of course, as mentioned above, in the simplest case one of gates 17 and 18 may be eliminated entirely and a single gate may be enabled to indicate a selected video polarity. In the Figure a plurality of burst frequency generators, namely generators 19a through 19d are shown. Further shown is a burst frequency selector 20 which may comprise manually set switches interconnecting the burst frequency generators with one of the gates 16, 17 or 18. The selected bursts are then applied to the encoded video signal whenever a particular gate is enabled as discussed above. It should further be noted that gates 16, 17 and 18 must be followed by a stage having a high output impedance prior to connection to the video throughline 21 carrying the encoded video signals, to prevent excessive loading of this line. Burst frequency generators 19a through 19d are standard oscillators furnishing frequencies of between 0.2 and 2 MHZ. A suitable circuit for one of the burst gates 16 through 18 and including a suitable circuit to effect the high output impedance mentioned above is shown in FIG. 9 and will be discussed in detail following the description of said Figure.

Figure 4:
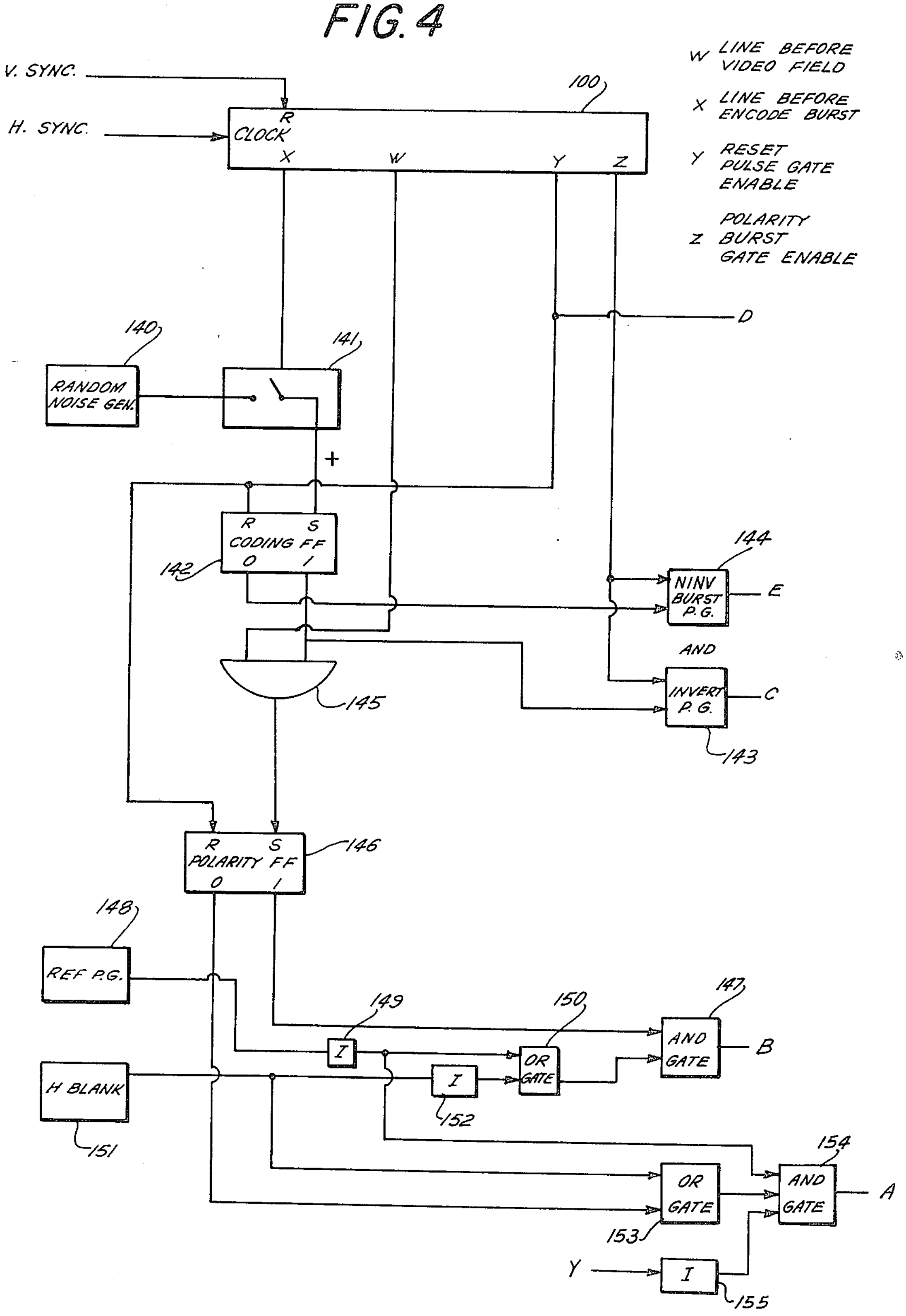
FIG. 4 is a more detailed block diagram of the gating generator of FIG. 3.

A more detailed diagram of the gating generator 15 of FIG. 3 is shown in FIG. 4. It should be noted with reference this Figure and all other block diagrams of this application, that a 1 output and a 0 output of a flip-flop refer to the states wherein the so-labelled outputs are enabled.

FIG. 4 shows a counter, 100, to whose count and reset inputs are, respectively, applied the horizontal and vertical synchronizing pulses derived from sync separators 13 of FIG. 3. This counter is an 8-bit counter and from it may be derived signals signifying particular lines in a given field. The random switching pulse generator 14 of FIG. 3 is shown embodied in a random noise generator 140 whose output comprises both positive and negative signals appearing randomly with respect to time. The output of random noise generator 140 is sampled by a sampling gate 141. When a counter output furnishes a signal corresponding to the line before the coding bursts, a switch 141 is closed to sample the state of the random noise generator. If the output of random noise generator 140 is a positive output, this will cause a setting of coding flip-flop 142 i.e., the 1 output is enabled. 1 Output of coding flip-flop 142 signifies that the video portion of the subsequent field is to be inverted. Thus it is necessary to enable inverting amplifier 12 during the video portion of the subsequent field; although non-inverting amplifier 11 must be activated during the horizontal blanking interval as well as the vertical blanking interval even during fields having an inverted video signal. Further it is necessary to insert the appropriate coding bursts, that is to enable black positive burst gate 18 at the correct times during the vertical blanking interval (see FIG. 2). Thus signal C (the enable signal for gate 18) must be furnished during the particular lines immediately preceding the black positive field, and at such times as do not include the reference pulse and horizontal blanking pulse. The timing for activating line C of FIG. 3 is indicated as coming from terminal Z of counter 100. This is a schematic indication signifying a timing corresponding to the lines for which the coding bursts are required. In theory and in the simplest case it could of course be only a single line during the vertical blanking interval. Of course, if the output of the coding flip-flop 142 had been a 0 the inverting burst pulse gate enable signal E would have been generated instead of the signal C. Signal E would be generated through AND gate 144. AND gate 144 furnishes signal E in response to a 0 output of flip-flop 142 occurring simultaneously with signal Z.

A 1 output of flip-flop 142 occurring simultaneously with a signal from terminal W of counter 100 causes an output to appear at the output of AND gate 145 which in turn sets a polarity of flip-flop 146. The signal on line W is a signal signifying the line before the video portion of the subsequent field. It will be noted that both the coding flip-flop 142 and polarity flip-flop 146 are reset by a signal appearing at terminal Y of counter 100. This terminal schematically indicates the time for the reset pulse gate enable signal D of FIG. 3. It will be seen that this occurs during the two lines immediately preceding the equalizing pulses in the vertical blanking interval. Again the reset pulses are timed to avoid interference with either the reference pulse, the horizontal synchronizing pulse or the color burst. Since the resetting of the flip-flop is accomplished by the first of these pulses, the second of course will be ineffective and is used for reliability only. It will be noted that polarity flip-flop 146 has a 1 output only when the coding flip-flop indicated that the video polarity of the next field is to be inverted and for a time period extending from the time that the flip-flop is set, namely from the timing of output W of counter 100, to the timing of output Y of counter 100. In other words, the whole vertical blanking interval is excluded as having a possible 1 output of flip-flop 146. Actually, reference to FIG. 2 will show that the output of flip-flop 146 ceases just prior to the beginning of the blanking interval, that is the last two lines of the preceding field are also excluded. Thus signal B which appears at the output of AND gate 147, one of whose inputs is the 1 output of flip-flop 146, can exist only in portions of the signal not including the vertical blanking interval. It is of course further also required to eliminate signal B during the times of the reference pulse and of the horizontal blanking interval. This is accomplished by taking the output of reference pulse generator 148, inverting it in inverter 149, and combining it in an OR gate 150 with the otuput of horizontal blanking generator 151, after inversion of said output by inverter 152. The output signal of OR gate 150 constitutes the second input of AND gate 147. It is thus seen that signal B will appear only for a 1 output of coding flip-flop 142 and only for that portion of the composite video signal which carries the actual video information. The synchronizing intervals will always pass through non inverting amplifier 11, since amplifier 12 will never be activated at times corresponding to said signals.

At any time that signal B is not available, signal A must of course be available except during the reference pulse, which, in accordance with a preferred embodiment of the present invention, is inserted into the television signal by cutoff of the amplifiers (11 or 12) passing the signal. It is thus seen that signal A is present when polarity flip-flop 146 has a 0 output and also during the horizontal blanking intervals. Again, it should be remembered that the "zero" output of flip-flop 146 is present throughout the vertical blanking interval.

The horizontal blanking generator 151 of FIG. 4 may be a simple monostable multivibrator which is switched to the nonstable state by the leading edge of the horizontal sync pulse and returns to the stable state after a predetermined interval which is set to coincide with the horizontal sync pulse interval including the back porch in order to permit transmittal of the color burst.

Figure 5A:
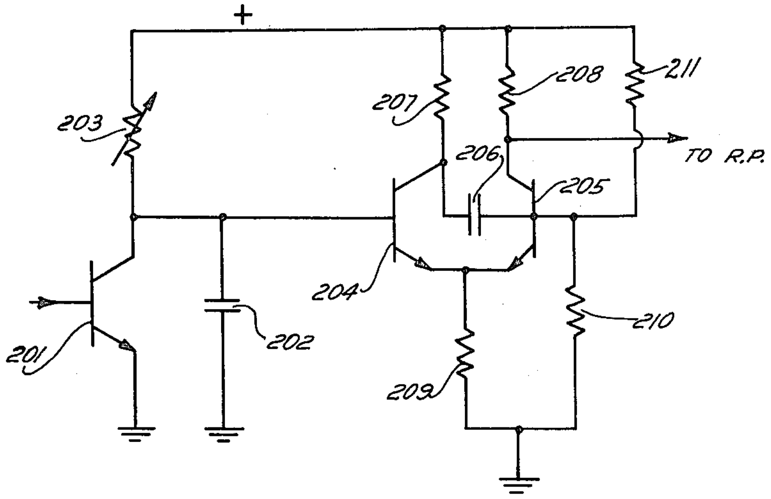
FIGS. 5*a* and 5*b* show, respectively, the reference pulse generator and corresponding waveforms.

FIG. 5*a* shows the reference pulse generator. As shown in said Figure, horizontal synchronizing pulses are applied to the base of a transistor 201 whose collector is connected to the positive supply line through a variable resistance 203 and to ground via a capacitor 202. The collectoı is further connected to the positive supply line via a resistance 207 and to the base of a transistor 205 via a capacitor 206. The collector of transistor 205 is connected to the positive supply line through a resistance 208, while the emitters of transistors 204 and 205 are connected to ground potential through a resistance 209.

Figure 5B:
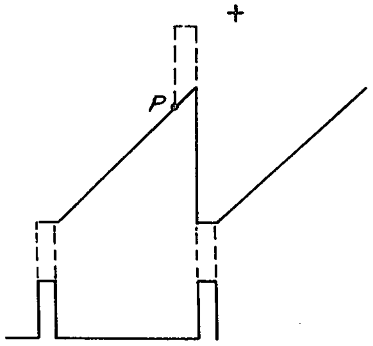

As shown in FIG. 5*b* capacitor 202 charges in a substantially linear fashion through resistance 203 (which thereby determines the charging rate) while transistor 201 is non-conductive. The horizontal synchronizing pulses applied at the base of transistor 201 switch the transistor to a conductive state shortcircuiting capacitor 202, and thereby discharging it. It will be noted that when the voltage across capacitor 202 reaches the point indicated by *P* in FIG. 5*b*, transistor 204 becomes conductive, causing transistor 205 to become non-conductive, and the voltage at its collector to assume substantially the voltage of the positive line. This results in the generation of the reference pulse which persists until receipt of the next subsequent horizontal synchronizing pulse at the base of transistor 201. It is thus seen that the leading edge of the reference pulse occurs at a predetermined time preceding the next sequential horizontal synchronizing pulse, which its trailing edge coincides with the leading edge of said horizontal synchronizing pulse.

Figure 6:
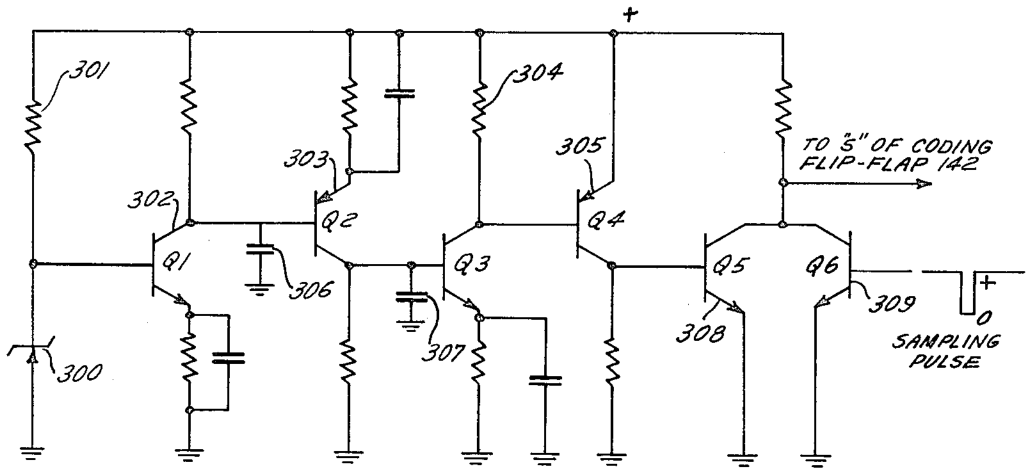
FIG. 6 shows the circuit diagram for the random switching pulse generator of FIG. 3.

FIG. 6 shows the random noise generator and its accompanying sampling gate. In particular a Zener diode 300 is used as a noise generator and has its cathode connected to the positive supply line through a resistor 301. The cathode of Zener diode 300 is further connected to the base of a transistor 302. Transistor 302 and subsequent transistors 303, 304 and 305 serve as amplifiers. Further, some band pass limiting may be accomplished by capacitors 306 and 307, respectively connected from the collectors of transistors 302 and 303 to ground. The output of transistor 305 is connected to the base of a transistor 308 which, in conjunction with transistor 309 constitute an AND gate. Normally transistor 309 is saturated, shortcircuiting the output of transistor 308. A sampling pulse applied at the base of transistor 309 blocks said transistor causing an output to appear at the common collector connection of transistors 308 and 309 in the event that the signal at the base of transistor 308 is negative. This output is furnished to the S input of coding flip-flop 142.

Figure 7:
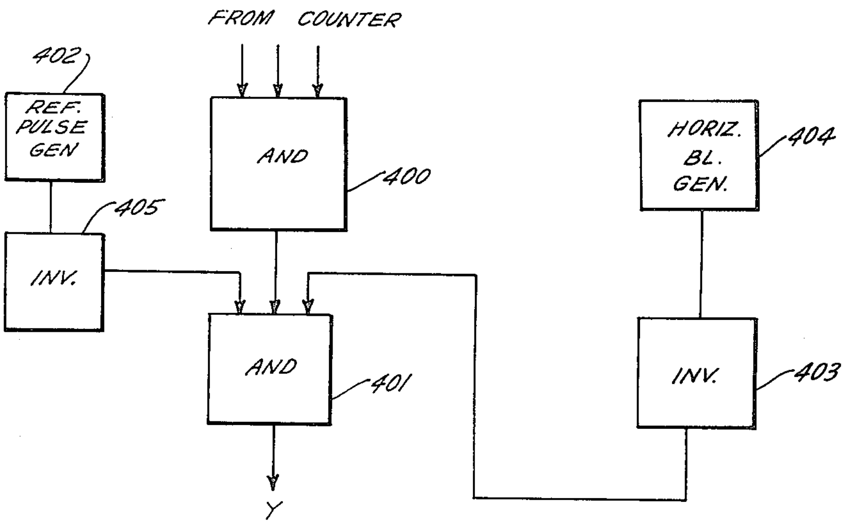
FIG. 7 is a more detailed block diagram showing the generation of the reset gate enable signals.

With reference to FIG. 4, the only thing that still need briefly be discussed is how the outputs WXYZ of the counter 100 are derived in order that not only do they signify the correct count, i.e., permit selection of a particular line in a field, but that the timing is correct to prevent interference with the reference pulse, the horizontal synchronizing pulse, and the color burst. The counter, as is well known, is a binary counter using a plurality of flip-flops. Any particular count can be determined by the correct combination of the outputs of various ones of these flip-flops. Reference to FIG. 7 shows that selected ones of the flip-flops have an output which is combined in an AND circuit 400. The output of AND circuit 400 is combined in a second AND circuit 401 with the inverted blanking and reference pulse generator outputs, derived from reference pulse generator 402 and blanking generator 404. The output of AND gate 401 then constitutes signal Y at the output of counter 100 which, again, is equivalent to signal D of FIG. 3. The timing for the polarity burst gate enable signal, signal Z, is derived in exactly the same fashion as described above. No further discussion is therefore necessary.

The gating signals A and B developed as shown in FIG. 4 are then applied to enable the non-inverting and inverting amplifiers 11 and 12 respectively.

Figure 8:
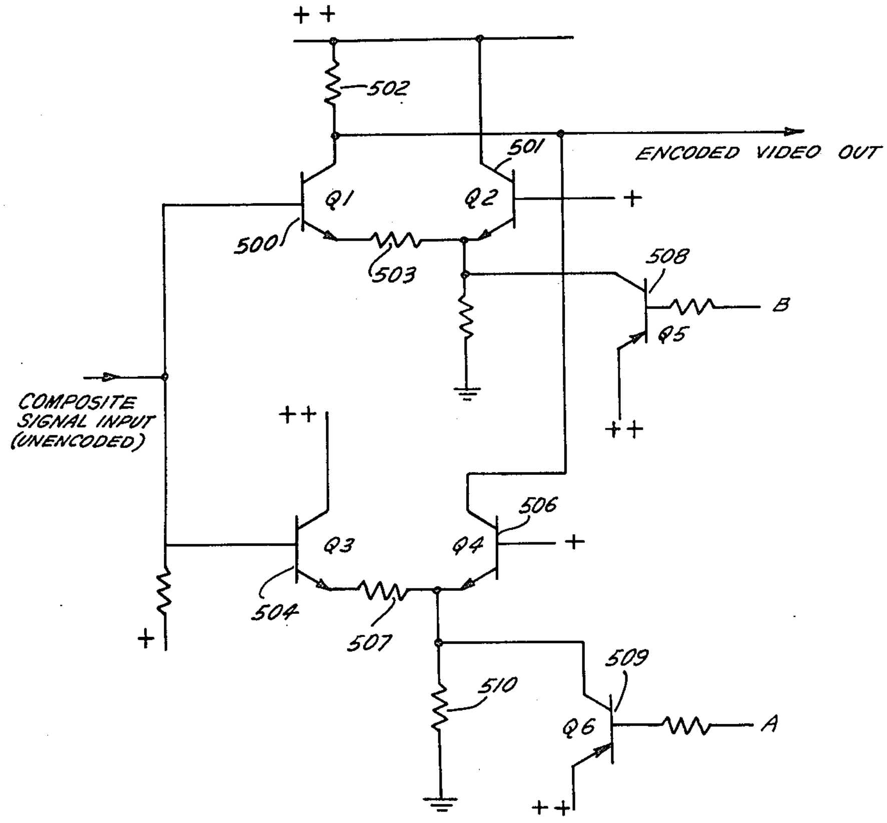
FIG. 8 shows the circuits for the inverting and non-inverting amplifiers of FIG. 3.

FIG. 8 shows the inverting and non-inverting amplifiers. The inverting amplifier comprises a transistor 500 and a transistor 501 which together constitute a differential amplifier. Specifically, the collector of transistor 500 is connected to the positive supply line via a resistance 502, while the collector of transistor 501 is directly connected to said positive supply line. The emitter of transistor 500 is connected to the emitter of transistor 501 by a resistance 503, which determines the gain of the differential amplifier. The emitter of transistor 501 is connected to ground potential via a resistor 505 whose resistance is substantially higher than the resistance of resistor 503. The output of the amplifier is derived from the collector of transistor 800. Further, a transistor 508 has an emitter-collector circuit connected from the ungrounded terminal of resistance 510 to the positive supply line.

The non-inverting amplifier is also a differential amplifier. This differential amplifier comprises transistors 504 and 506 whose emitters are interconnected by a resistance 507. The collector of transistor 504 is directly connected to the positive supply line, while the collector of transistor 506 is connected in common with the collector of transistor 500. This common connection constitutes the output furnishing the encoded television signal. Also, transistor 509 has its emitter-collector circuit connected from the ungrounded terminal of resistance 807*a*to the positive supply line.

Gating signal B is applied to the base of the transistor 508, while gating signal A is applied to the base of transistor 509.

The circuit operates as follows:

The unencoded television signal is applied simultaneously to the bases of both transistor 500 and transistor 504. In the presence of an enable signal B at the base of transistor 508, this transistor is blocked allowing the differential amplifier comprising transistors 500 and 501 to operate normally. In the absence of such enable signal, transistor 508 is conductive, thereby shortcircuiting the emitters of transistors 500 and 501 to the positive supply line. This causes both transistors to block, causing the output at the collectors to be substantially the positive supply voltage.

Application of enable signal A to the base of transistor 509 causes the same operation of the non-inverting amplifier, that is the differential amplifier comprising transistors 504 and 506.

Figure 9:
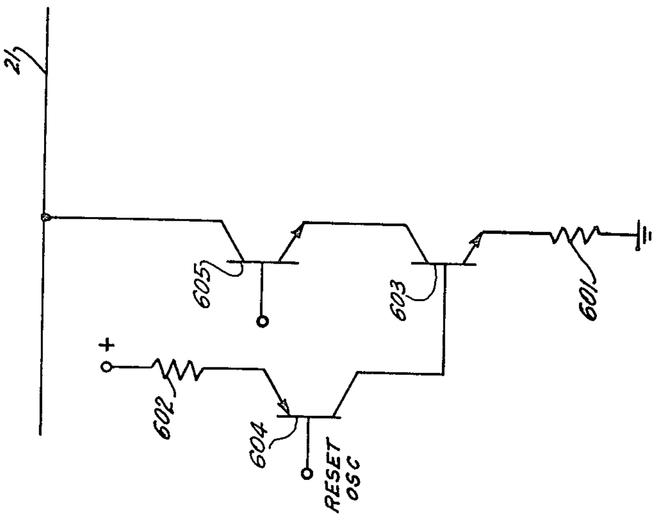
FIG. 9 shows the circuit for the reset burst gate of FIG. 3.

The above-described amplifiers thus furnish at their common output an encoded video signal which has a video portion inverted at a random rate and a synchronizing portion which is uneffected by the encoding process. The only change in the synchronizing signal is the addition of a reference pulse to the front porch of the horizontal sync pulses. It is now required that the reset bursts and the coding bursts be added to the signal prior to modulating the resulting signal onto a suitable carrier. A suitable burst insertion circuit is shown in FIG. 9. The top horizontal line in the Figure, labelled 21, is the video through line, that is the line leading to the collectors of transistors 506 and 500 in FIG. 8. At the time of the reset burst insertion, both the inverting and non-inverting amplifiers must be cutoff in order to prevent interaction between the video signal which is still coming through at this point and the reset burst. The inverting amplifier is cutoff in any case because the polarity flip-flop has been reset at this point. The non-inverting amplifier is cut off by furnishing an inverted Y signal to a third input of AND gate 154 of FIG. 4. FIG. 9 comprises two transistors, namely a transistor 603 and 605 whose emitter-collector circuits are connected in series to the video through-line. The emitter of transistor 603 is connected to ground through a resistance 601. The signal Y is applied to the base of transistor 605. The base of transistor 603 is connected to the collector of transistor 604 whose emitter is connected to the positive supply line through a resistance 602. The output of the reset oscillator is applied to the base of transistor 604.

The above-described circuit operates as follows:

Transistor 605 is operated at cut-off, preventing any oscillations from the reset oscillator from reaching the video through line until the arrival of the signal Y. For the duration of the Y signal transistor 605 is made conductive. When transistor 605 is conductive, the reset burst is inserted into the line at a D.C. level depending upon the D.C. current flowing through the emitter-collector circuits of transistors 605 and 603.

Said burst has thus been inserted into a video through line at a desired D.C. level and at a time corresponding to the signal Y.

The coding bursts, indicating that the video signal is or is not inverted, are inserted in a similar manner in response to signals C and E respectively. The coding burst insertion circuitry therefore is not illustrated.

The signal appearing on line 21 after the above-described burst injection is suitable for directly-modulation onto a carrier in a standard transmitter. The signal is modulated onto the carrier in such a manner that the transmitter clamps to the tip of the reference pulse rather than to the tip of the horizontal sync pulse. Full $R^F$ power is developed for the reference pulse as was shown in line D of FIG. 1.

The above-description has concerned only the video portion of the transmitted signal. Encoding of the audio signal also takes place. In accordance with the present invention the program audio signal is modulated onto a square wave carrier having a frequency of 31.5 KHz. The carrier signal may be derived by frequency doubling from the horizontal synchronizing signal. The program audio signal is modulated onto this carrier signal in such a manner that a suppressed carrier modulation signal is generated whose bandwidth is approximately 17 KHz. In addition to the so-encoded program audio signal, in accordance to the present invention, a barker signal is generated which occupies that part of the frequency spectrum normally associated with the program audio signal. The barker signal thus occupies a frequency range up to approximately 15 KHz. This barker signal is to be intelligible at the receiver even without the use of the decoder and is used for advertising the program on the air. It may for example state how long the program has been on, how long the program will continue, and any other information which the subscriber may require before deciding whether or not to pay for the particular program on the air. Care must be taken that when the barker signal modulates the audio transmitter, side bands in excess of 15 KHz are not produced in order that the encoded audio signal may not suffer from interference.

Figure 10A:
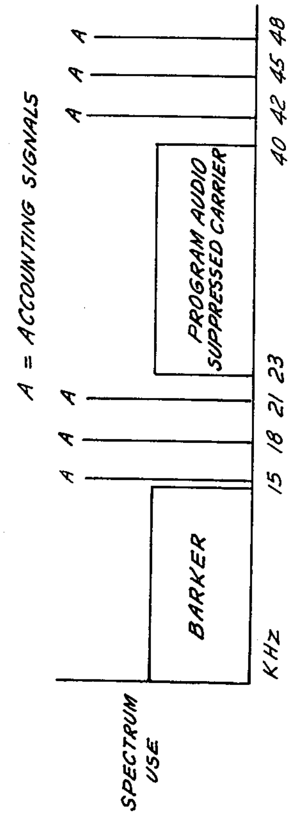
FIGS. 10*a* and 10*b* show, respectively, the spectrum usage and the encoding system for the audio portion of the signals.
Figure 10B:
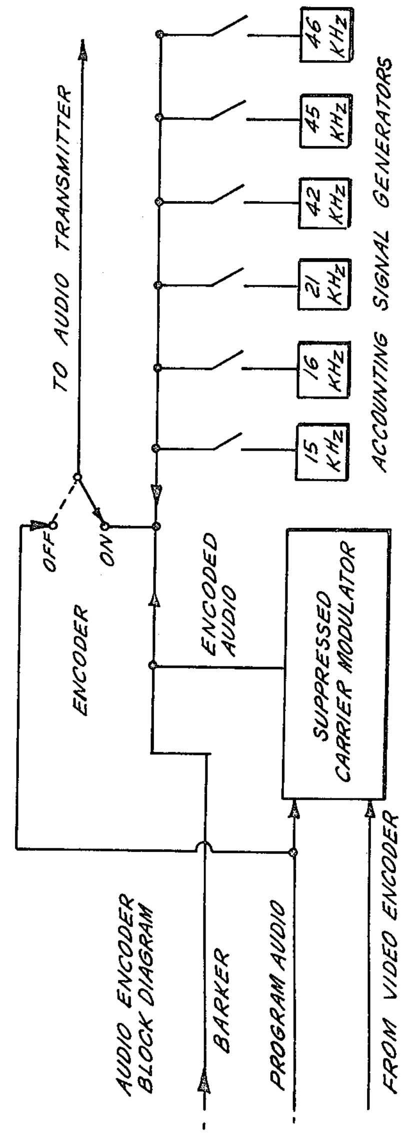

It is further possible in accordance with the present invention to transmit accounting signals in these portions of the band not occupied by either the encoded program audio or the barker signal. As shown in the Figure accounting signals may for example be generated at 18, 21, 42, 45 and 48 KHz. These signals in various combinations may be used to enable the appropriate burst detectors at the decoder so that the video portion of the decoder will function correctly. The system necessary to generate the above wave form is shown in FIG. 10*b*. It is seen that a barker signal is filtered and combined with a program audio signal which has previously been modulated onto a 31.5 KHz signal from the video encoder. The suppressed carrier modulator output is mixed with the filtered barker signal and is further mixed with the signals from various accounting signal generators which are switched into the circuit by switches S1 – S5 in accordance with the desired coding and which, as mentioned above, will activate the video portion of the decoder accordingly. Further shown in FIG. 10*b* is a switch S6 which connects the combined audio signal to the audio transmitter when the encoder is on and disconnects the signal from the audio transmitter when the encoder is off.

Figure 11:
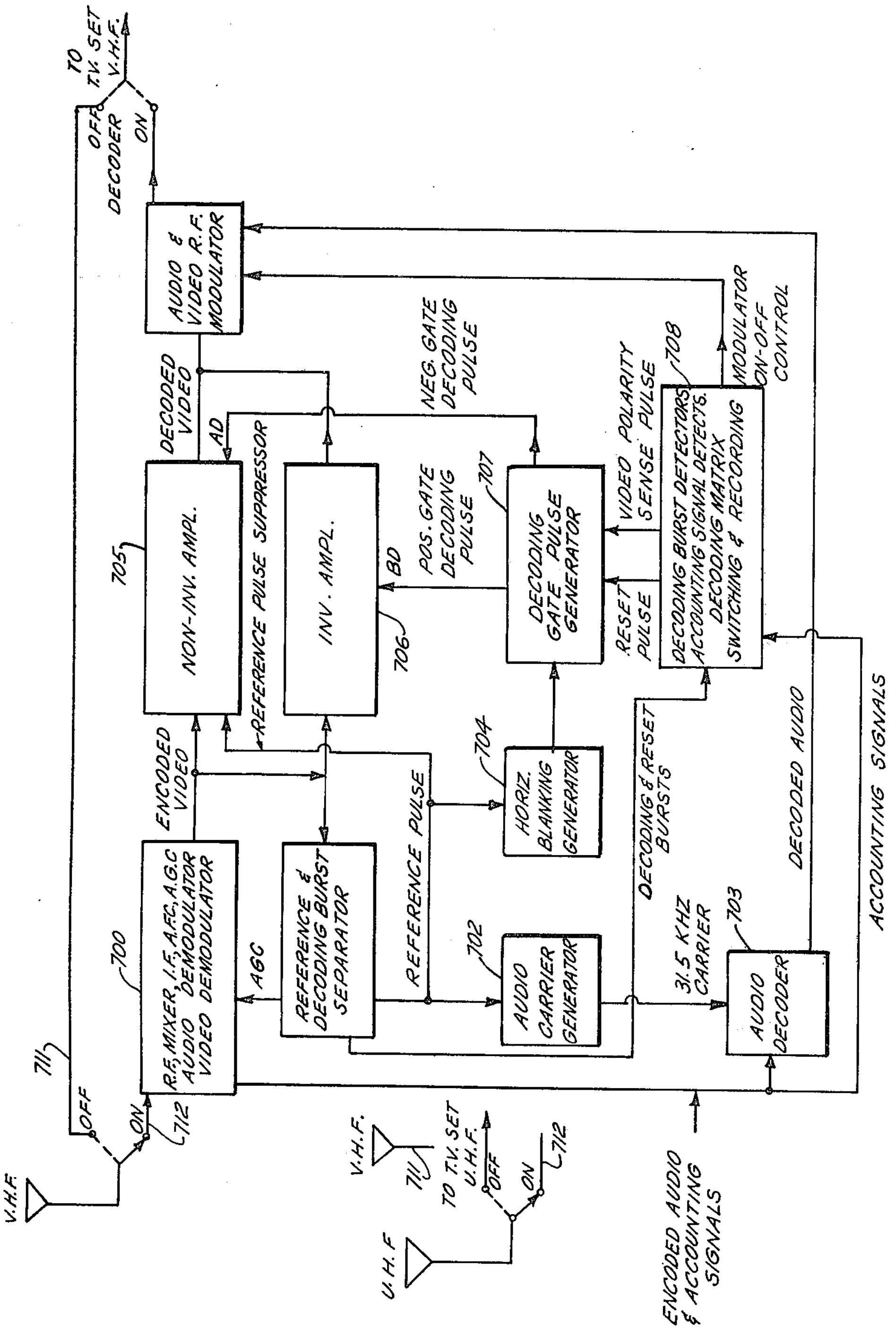
FIG. 11 shows a decoder block diagram.

The above concludes the description of the encoding mechanism required for the present invention. The equipment at the receiver, namely the decoding equipment, will now be described. FIG. 11 is a decoding system block diagram. At this point it must be kept in mind that the received signal contains all vertical and horizontal synchronizing pulses and further contains a reference pulse which occupies the levels normally associated with the horizontal synchronizing pulses. Further, the received signal is a signal whose video portion is at times inverted. It contains coding bursts which indicate whether the next field to be received is or is not inverted. It is thus the function of the decoding system to extract from the received signal the reference signal and the decoding bursts, to cancel the reference signal and to employ the decoding bursts to set gates which will, if necessary, switch the polarity of the video signal, thereby generating a decoded video signal of correct polarity.

The incoming signal is applied to a decoder having the standard input circuits of a television receiver, namely to the RF stage, and hence passes through the mixer, the IF stage, the audio demodulator and the video demodulator. Here it must be noted that for the automatic gain control circuits the reference pulse is used. This is discussed in detail in connection with FIG. 12 below. It suffices to state here that the top of the reference pulse serves as a reference level throughout the decoder. The output of block 700 is thus the encoded composite television signal having the reference pulses and having, for some fields, an inverted video signal. From this encoded television signal are separated the reference pulse and the decoding bursts in block 701. Since the reference pulse and the decoding bursts are at a level far removed from that of the synchronizing and video signals, the separation of the reference pulse and of the decoding bursts can be made simply by means of a circuit biased to eliminate the standard television signal (See also FIG. 12). The reference pulse, besides being used to clamp the level of the signal by use in the automatic gain control circuit is also used to cancel out the reference pulse in the final decoded signal. It is further used to activate an audio carrier generator for reinsertion of the audio carrier into the encoded audio signal. The audio decoder 703, shown as connected to the audio carrier generator 702, also contains a demodulatcr circuit. Its output is therefore a decoded audio signal.

The reference pulse derived from unit 701 is further used for a generating horizontal blanking signals, that is, it triggers horizontal blanking generator 704. Further reference to FIG. 11 shows that the output signal from unit 700, namely the encoded television signal is applied to a non-inverting amplifier and an inverting amplifier just as was done in the encoder. It is thus required to furnish enabling signals for the non-inverting and the inverting amplifier just as was required in the encoder. In FIG. 11, the non-inverting amplifier has reference numeral 705, while the inverting amplifier has reference numeral 706. Again it is necessary to furnish a signal to enable the non-inverting amplifier 705 during all synchronizing intervals and during those portions of the signal wherein non-inverted video is present in the encoded signal. The inverting amplifier 706 is enabled only when the encoded signal has video portions which have been inverted at the encoder. The enabling signal for the non-inverting amplifier is furnished on a line labelled $A_D$, while the signal enabling inverting amplifier 706 is furnished on a line labelled $B_D$. As will be shown in detail in the description of FIG. 14, lines $A_D$ and $B_D$ are controlled by the outputs of a flip-flop. The flip-flop is reset prior to each field by a reset pulse derived from the reset burst. The video polarity sense pulse derived from the coding bursts signifying an inversion is then used to switch the decoding gate flip-flop in such a manner that an output on line $B_D$ results which causes the inverting amplifier to become operative. In the absence of such a video polarity sense pulse the flip-flop remains in the state wherein the signal $A_D$ is furnished, causing the non-inverting amplifier to be operative. The outputs of amplifier 705 and 706 are then combined and furnish a decoded video signal. This decoded video signal is modulated onto a carrier which is available in the area. The resulting signal is a standard television signal and is applied directly to the subscriber's television receiver. The circuits required in the block diagram shown in FIG. 11 will now be described in detail with reference to FIGS. 12, 13 and 14.

Figure 12:
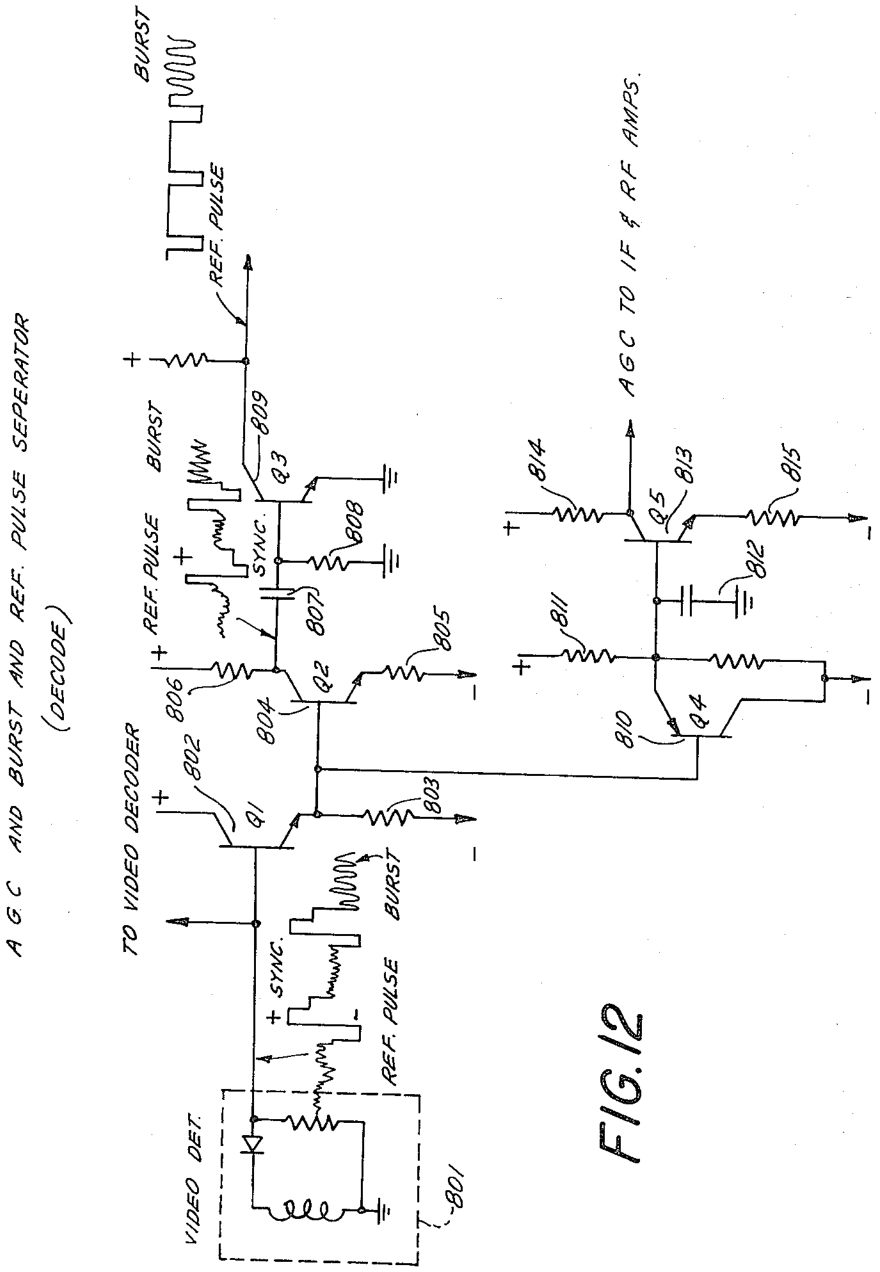
FIG. 12 shows the circuits for the reference pulse and burst separator of FIG. 11.

FIG. 12 shows the burst and reference pulse separator circuit diagrams as well as a circuit for deriving an AGC signal from the reference pulse. The received composite encoded television signal after passing through the standard RF and IF stages is demodulated in demodulator 801. The so-demodulated signal is applied to an emitter-follower circuit comprising a transistor 802 havng an emitter resistor 803. The voltage across the emitter-resistor 803 is applied, first, to the base of a transistor 804 whose emitter is connected to the positive line via a resistance 806. The signal derived from the collecter of transistor 804 is applied to the base of a transistor 809 through a capacitance 806. The base of transistor 809 is further connected to ground via a resistor 808. The biasing of transistor 809 is such that only the reference pulse and the burst pulses appear at the collector of transistor 809.

The signal at the emitter of transmitter 802 is further applied to the base of a transistor 810. Transistor 810 is biased to cutoff until a highly negative signal, namely the reference pulse and the burst pulses appear at the collector of transistor 809.

The signal at the emitter of transistor 802 is further applied to the base of a transistor 810. Transistor 810 is biased to cutoff until a highly negative signal, namely the reference pulse, appears at its base. The signal at the emitter of transistor 810 is integrated by use of a capacitor 812 connected between said emitter and ground. The voltage across capacitor 812 is applied to the base of a transistor 813 whose collector is connected to the positive supply line through a resistance 814, while its emitter is connected to a negative supply via resistor 815. The output resulting at the collector of transistor 813 is a substantially steady DC level which is applied for automatic gain control to the IF and RF amplifiers.

Figure 13:
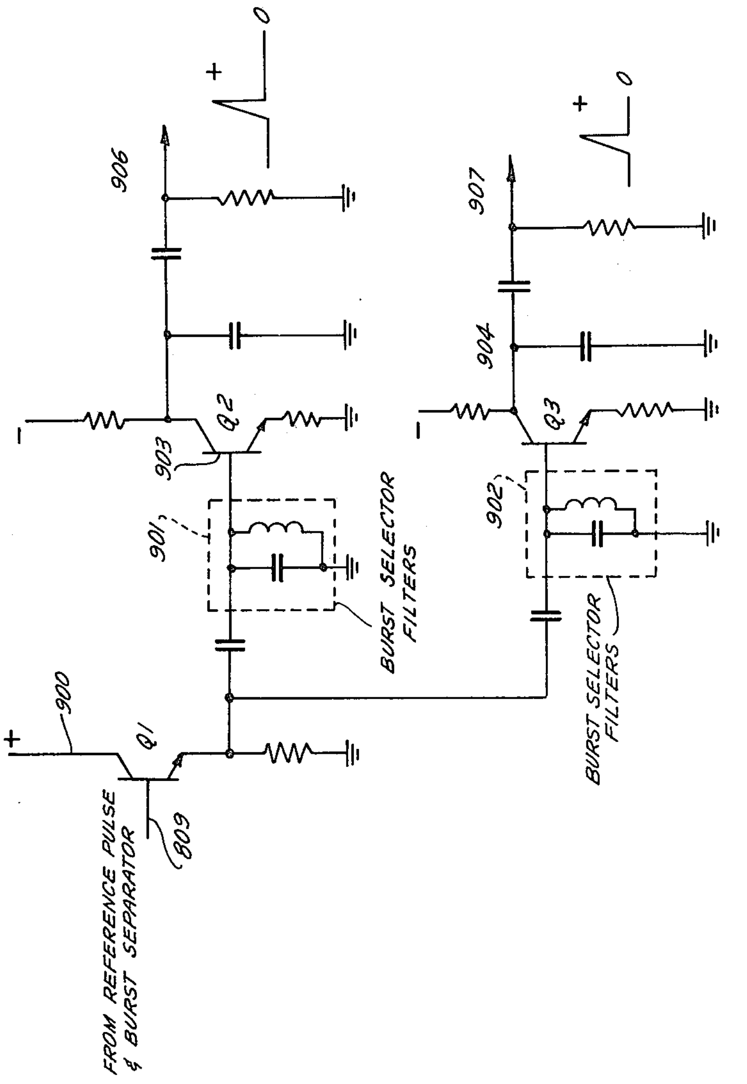
FIG. 13 shows the circuit for generating the reset and decode triggers.

As shown in FIG. 13, the signals from the collector of transistor 809 of FIG. 12 are applied to the base of a transistor 900. This transistor, connected as an emitter follower, forms the input of the circuit generating the reset and decode triggers from the bursts. Specifically the signal at the emitter of transistor 900 is simultaneously applied to a tuned circuit tuned to the frequency of the reset burst (901) and a second tuned circuit (902) tuned to the frequency of the decode burst. The output of the reset burst tuned circuit is applied to transistor 903 which with its associated circuitry constitutes the reset burst detector, while the output of tuned circuit 902 is connected to the base of a transistor 904 constituting a decode burst detector. The signals at collectors of transistors 903 and 904 after passage through respective low pass filters cause the generation of the reset trigger and decode trigger respectively.

Figure 14:
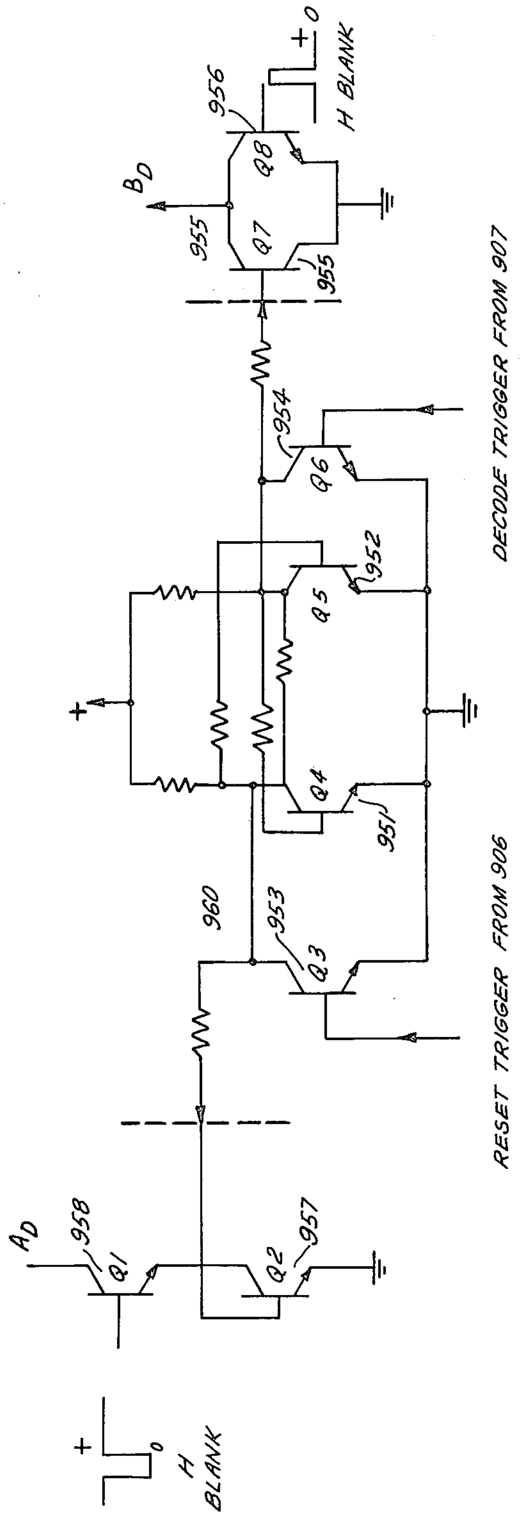
FIG. 14 shows the circuit for furnishing the enabling signals for the inverting and non-inverting amplifiers of the decoder.

The so-generated reset and decode triggers in turn control, at least in part, the circuit for generating the enabling signals for the inverting and non-inverting amplifier in the decoder, which will now be described with reference to FIG. 14. As shown in said figure, the circuit comprises in the main a flip-flop having transistors 951, 952, 953 and 954. Transistors 951–954 all have emitters connected to ground potential. The collector of transistor 951 is connected directly to the collector of transistor 953, while the collector of transistor 954 is directly connected to the collector of transistor 952. Each pair of collectors is connected to the positive supply lines through a resistance and, further, the collectors of transistors 951 and 953 are resistance-coupled to the base of transistor 952 while the collectors of transistors 952 and 954 are resistance coupled to the base of transistor 951. The reset trigger derived from terminal 906 is applied at the base of transistor 953, while the decode trigger derived from terminal 907 is applied to the base of transistor 954. The collector of transistors 958 is connected to line $A_D$. The horizontal blanking signal is applied with negative polarity at the base of transistor 958. Further the collectors of transistors 952 and 954 are resistance coupled to the base of a transistor 955 whose emitter-collector circuit is connected in parallel with that of a transistor 956. The signal appearing at the output of the commonly connected collectors of transistors 956 and 960 is the signal on line $B_D$.

The above described circuit operates as follows:

Assume a reset trigger signal is applied to the base of transistor 953. This causes the transistor to become conductive, causing voltage at its collector to drop. This in turn causes the cut-off of transistor 957. When transistor 957 is off, line $A_D$ is disconnected from ground and the non-inverting amplifier is on. Similarly the application of a negative pulse during the horizontal blanking interval at the base of transistor 958 causes this transistor to turn off, again causing the non-inverting amplifier to be operative.

Following the application of the reset trigger from terminal 906, the collector of transistor 954 is at a high potential, causing transistor 955 to be conductive. This in turn connects line $B_D$ to ground potential thereby causing the inverting amplifier to be inoperative. Further, transistor 956 is normally operated at cut-off but becomes conductive during the horizontal blanking interval by the application of the horizontal blanking pulse with positive polarity to the base of said transistor. This in turn connects the line $B_D$ to ground, again assuring that the inverting amplifier is inoperative during the horizontal blanking intervals.

Application of the decode trigger from terminal 907 causes transistor 954 to become conductive, thereby causing the flip-flop to switch state. In this second state the collector of transistor 954 is at a low potential causing transistor 955 to be cut off. Since transistor 956 is cut off except during the horizontal blanking interval, the cut-off of transistor 955 causes terminal $B_D$ to be disconnected from ground. Under these conditions transistor 508 of FIG. 8 is non-conductive, the inverting amplifier thus being operative. Only when a horizontal blanking signal is applied with positive polarity to the base of transistor 956 is line $B_D$ again connected to ground potential, thereby causing transistor 508 to become conductive, blocking the inverting amplifier. This mode of operation will continue until the application of the next reset trigger signal. This occurs just prior to the next subsequent vertical blanking interval. The decode unit is thus always set to operate the non-inverting amplifier during the vertical blanking interval and will continue to operate with the non-inverting amplifier unless a decode trigger is received. The use of such a reset pulse thus allows particularly simple equipment to be used at the decoder. Of course it is much more important that the decoder unit be inexpensive than the encoder unit. This thus represents a very favorable embodiment of the present invention.

It should also be noted that, in the above discussion, reference was made to FIG. 8 which shows the inverting and non-inverting amplifiers may be used in the decoder units and therefore no additional figure is required.

It will be noted that the system has been described in particular with a reference pulse on the front pulse of the horizontal synchronizing pulse. Of course the reference pulse could also be inserted at other times within the composite television signal which contains signals independent of picture content. Further of course the video portion of the signal could be inverted at a predetermined rate, rather than in the random fashion described herein. The inversion, the introduction of the reference pulse, the generation and the introduction of the bursts into the composite signals can of course be accomplished with other circuits than those disclosed herein. The circuits disclosed herein constitute a preferred embodiment, but it is not intended that the invention be limited thereto.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended.

1. Apparatus for encoding a standard composite television signal having video signals for conveying the picture to be televised, said video signals having amplitudes varying between a first and second reference level respectively signifying picture black and white, said standard composite television signal further having horizontal and vertical synchronizing signals occurring during horizontal and vertical blanking intervals for synchronizing the television receiver to the television transmitter, said synchronizing signals having determined synchronizing levels and polarities relative to a determined one of said first and second reference levels, comprising, in combination, first transmitter circuit means having a signal input for receiving said composite television signal, an output, and a control input for receiving a control signal, for transmitting said composite television signal from said input to said output in such a manner that the polarity of said video signals relative to said selected one of said reference levels remains unchanged or is reversed throughout at least the subsequent field in dependence upon a control signal; controls means connected to said circuit means for furnishing a plurality of control signals, each during a randomly selected one of said vertical blanking intervals and applying said control signal to said control input of said first circuit means; and additional transmitter circuit means connected to said first transmitter circuit means and said control means for applying a coding signal to said composite television signal at a determined time instant in each of said randomly selected vertical blanking intervals in response to each of said control signals, thereby creating a coded composite television signal.

2. Apparatus as set forth in claim 1, wherein said first transmitter circuit means comprise means for transmitting said composite television signal from said input to said output in such a manner that the polarity of said video signals relative to said selected one of said reference levels remains unchanged in the absence of said control signal and is reversed throughout at least the subsequent field in response to said control signal.

3. Apparatus as set forth in claim 2, further comprising transmitting means for transmitting said coded composite television signal; receiving means for receiving said so-transmitted coded composite television signal and furnishing a received coded television signal in response thereto; first receiver circuit means connected to said receiving means for separating said coding signals from said received coded television signal thereby furnishing decoding signals; and second receiver circuit means connected to said first receiver circuit means and having an input for receiving said received coded television signal, an output, and a control input for receiving said decoding signals, for inverting the polarity of said video signals throughout the subsequent field relative to said determined one of said reference levels in response to a decoding signal and maintaining the polarity of said video signals relative to said selected one of said reference levels in the absence of said decoding signals, thereby furnishing a decoded composite television signal at said output of said second receiver circuit means.

4. Apparatus as set forth in claim 2, wherein said first transmitter circuit means comprise an inverting amplifier and a non-inverting amplifier connected in parallel and having a common input and a common output; and wherein said control means comprise enabling means for selectively enabling one and disabling the other of said inverting and non-inverting amplifiers.

5. Apparatus as set forth in claim 3, wherein said second receiver circuit means comprise an inverting and a non-inverting amplifier connected in parallel and having a common input and a common output, and receiver enabling means for selectively enabling one and disabling the other of said inverting and non-inverting amplifier means at least in part in dependence on the absence or presence of one of said decoding signals.

6. Apparatus as set forth in claim 5, wherein said encoded television signal further has reset bursts preceding each of said vertical blanking intervals; wherein said first receiver circuit means further comprises means for separating said reset bursts from said coded television signal thereby furnishing separated reset bursts; wherein said second receiver circuit means comprise a bistable circuit having a first and second stable state connected to said first receiver circuit means in such a manner that each of said decoding signals set said bistable circuit to said second stable state and that each of said separated reset bursts sets said bistable circuit to said first stable state, and connecting means for connecting said enabling means to said bistable circuit means in such a manner that said non-inverting amplifier is enabled when said bistable circuit is in said first stable state and said inverting amplifier is enabled only during said horizontal line trace intervals when said bistable circuit is in said first stable state.

* * * * *